United States Patent [19]

Mashio et al.

[11] 4,391,945

[45] Jul. 5, 1983

[54] CHELATE RESIN PREPARED BY REACTING BUTANE-1,2,3,4-TETRA-CARBOXYLIC ACID OR ANHYDRIDE WITH POLYETHYLENE POLYAMINE

[75] Inventors: Fujio Mashio; Shuji Kitamura, both of Kyoto, Japan

[73] Assignee: Mitsi Toatsu Inorganic Chemicals, Inc., Tokyo, Japan

[21] Appl. No.: 251,789

[22] Filed: Apr. 7, 1981

[30] Foreign Application Priority Data

Apr. 10, 1980 [JP] Japan .................................. 55-47699

[51] Int. Cl.$^3$ .............................................. C08G 69/26
[52] U.S. Cl. .................................... 524/600; 524/845; 525/420; 525/435; 525/436; 528/336; 528/342; 528/351; 528/353
[58] Field of Search .................. 260/29.2 R; 525/420, 525/435, 436; 528/336, 342, 351, 353; 524/600, 845

[56] References Cited

PUBLICATIONS

Minami et al., Chem. Abstr., vol. 80, 1974, 84401U.

J. B. Gardner et al., J. Appln. Polymer Sci., 9, 715 (1965).
L. R. Morris et al., J. Am. Chem. Soc. 81, 377 (1959).
Marhol et al., Talanta, 21, 751 (1974).
J. F. Dingman et al., Anal. Chem. 46, 774 (1974).

*Primary Examiner*—Maurice J. Welsh
*Attorney, Agent, or Firm*—Stevens, Davis, Miller & Mosher

[57] ABSTRACT

The present invention relates to an amphoteric resin obtained by condensation of polyethylenepolyamine and butane-1,2,3,4-tetra-carboxylic acid. The present invention can provide several forms of amphoteric resins such as linear structure, somewhat cross-linked water insoluble and water swellable structure and water insoluble and cross-linked structure, since the resin contains in its repeating units an imino group, a carboxylic radical and an amido group. The resin can form a chelate with several kinds of metal ions. Furthermore, the resin can also be modified by introducing several kinds of functional groups to bestow upon the resin particular chelating ability. Therefore the invention can provide novel resins, which have a strong chelating faculty and are suitably used for removing and recovering agents of heavy metals and noble metals.

31 Claims, 5 Drawing Figures

CHELATE RESIN PREPARED BY REACTING BUTANE-1,2,3,4-TETRA-CARBOXYLIC ACID OR ANHYDRIDE WITH POLYETHYLENE POLYAMINE

FIELD OF THE INVENTION

The present invention relates to a chelate resin. More particularly, the invention relates to a novel amphoteric polyamide chelate resin which contains imino and amide groups in the main chain and carboxyl groups pending from the main chain, said resin having particular properties suitable for a chelate resin, and to a process for preparation and uses thereof.

Heretofore, several investigations have been made regarding chelate resins and many of them have been practically used for commercial purposes.

For example, chelate resins are now used in the fields of catalysts, analytical agents, masking agents, electro conductive resins, heavy metal capturing resins and the like.

Chelate resins are now applied in various industrial fields as mentioned above. However, in connection with the public pollution problem, a chelate resin showing a superior performance for removal and recovery of heavy metals is now being sought.

The inventors have conducted wide studies regarding research on chelate resins used for the removal of heavy metal ions, and have arrived at the present invention.

The chelate resin of the invention is particularly suitable for use as a removing and recovering agent of noble metals and heavy metals.

DESCRIPTION OF THE PRIOR ART

The chelate resin is a polymer and bears functional groups acting as chelating groups thereon. For this purpose cross-linked polystyrene has been widely used and several kinds of chelating groups such as amino diacetic acid groups are introduced into the phenyl groups thereof.

The introduction of chelate groups on the phenyl group is ordinarily achieved by means of the following procedures.

One method is to, at first, prepare a cross-linked polystyrene in the form of beads and then introduce the functional groups into the phenyl groups of the polystyrene beads (see: J. B. Gardner et al: J. Appln. Polymer Sci., 9, 715, (1965)).

Another method is to, at first, introduce the functional groups into the phenyl group of styrene monomer, and then polymerize the styrene monomer bearing the functional groups (L. R. Morris et al: J. Am. Chem. Soc. 81, 377 (1959)).

Several kinds of investigations have been made on such a polystyrene based polyamino-polycarboxylic acid chelate resin.

On the other hand, a series of polyamino-polycarboxylic acid resins bearing keto-groups as coordinating members on the phenyl group have been known (M. Marhol et al: Talanta, 21, 751 (1974)).

Furthermore, a polyamide chelate resin having an EDTA structure on the main chain has been prepared by the ring opening reaction of EDTA dianhydride with diamine (M. UEDA et al, Kobunshi-ronbunshu, JAPAN 32 No. 4, p225-228 (1975)).

As still another example, a polymer having a thioalcohol radical as a chelating group has been known (A. V. Smirnov et al: Vysakomolekul. Soedin, B-9, 657 (1967)).

Furthermore, an another type of chelate resin having a dithiocarbamic acid as chelating functional group has been known, the resin being prepared by reacting carbon disulfide with polyethyleneimine. The chelate resin absorbs well $Ag^+$ and $Hg^{2+}$ ions (J. F. Dingman et al, Anal. Chem. 46, 774 (1974)).

As illustrated above, many types of chelate resins have been known in the prior art as the result of intensive research by several investigators, and the chelate resins obtained show respectively particular selective chelating properties, and they absorb selectively various kinds of metal ions such as $Co^{3+}$, $Zn^{2+}$, $Fe^{2+}$, $Cu^{2+}$, $Hg^{2+}$, $Ag^+$, $Au^{3+}$, and the like.

However, these known chelate resins are expensive in general. For example, in order to obtain aminomethylated polystyrene, four reaction steps are needed and a difficult solid-liquid reaction is included in the reaction steps. Therefore the process embraces such problems as to have the polymer swelled to introduce three-dimensionally large chelating groups into solid polymer beads and moreover it is necessary to prepare porous polymer beads to attain good swelling.

On the other hand, in the case of polmerizing a monomer bearing a chelating group thereon, side reactions easily occur owing to the high reactivity of both the monomer and the chelating groups and furthermore these chelating groups on the monomer must be protected from decomposition in the course of polymerization.

Under such present circumstances the inventors have made intensive studies on finding a chelate resin for which raw materials are easily obtainable and involving reaction steps which are simple. As the results of the studies, a particular chelate resin has been produced by poly-condensation of butane-1,2,3,4-tetra-carboxylic acid and polyethylene polyamine.

Furthermore, it has been found that another type of chelate resin which demonstrates particular chelating functions can be derived from the above chelate resin by introducing other chelating functional groups into the imino groups in the main chain of the resin.

SUMMARY OF THE INVENTION

The resin of the invention has a strong chelating capacity and shows superior performance in the field of recovery and removal of noble and heavy metals.

Accordingly, the present invention can provide the amphoteric resin and the resin derived from it by modification thereof as mentioned above, and these resins show strong chelate abilities and are particularly suitable for recovery and removal of noble metals and heavy metals.

Accordingly, the object of the invention is to provide the amphoteric resin mentioned above.

Another object of the invention is to provide a process for preparing the said amphoteric polyamide resin.

Still another object of the invention is to provide a chelating agent made of the said amphoteric polyamide resin or the salts thereof.

A further object of the invention is to provide a recovering agent or removing agent for noble or heavy metals made of the said amphoteric resin.

A still further object of the invention is to provide a process for removing or recovering the noble or heavy metals.

Furthermore, still another object of the invention is to provide a resin having improved chelating properties obtained by introducing other functional groups into the said resin.

DETAILED DESCRIPTION OF THE PREFERRED EMBODIMENTS

The present invention relates to a polyamide resin having a low degree of polymerization shown by formula (I):

wherein, m stands for an integer of 2 to 6 or for a mixture having an average value of 4 to 5, n stands for a mixture having an average value of 4 to 10.

X stands for $-OH$ or $-NH-CH_2CH_2{\frac{}{}}_m NH_2$, and Y signifies H or

The resin has carboxylic acid groups in side chains and imino and amide groups in the main chain. Therefore the resin shows high solubility in water, because a carboxylic acid ion is derived from a carboxylic group on the resin in an alkaline state, a quaternary amino group is formed from the imino group in an acidic medium and amphoteric ions are prepared in the neutral state to form a salt between molecules or within molecules to make the resin stable in water. Therefore the resin dissolves in water in a wide pH range and has a high degree of hydrophilic property and shows a water absorbing property. The resin, thus, belongs to the class of amphoteric resins.

The resin forms a stable chelate with many kinds of ions such as Cu, Ag, Hg, Pd, Fe, Ni, Co, Cr, and Cd and the like, by the action of imino and carbonyl groups in the main chain and carboxylic acid groups of the side chains. Therefore the resin shows prominent effects for the recovery and removal of the noble and heavy metals.

The resin of the invention is stable at a temperature lower than 130° C. in water and organic solvents and in the air. However, once the resin is heated to a temperature of 130° C. or higher, a chain-extending and crosslinking reaction occurs between a carboxylic acid group and an imino group and the resin is converted into a water insoluble resin having limited swelling ability in water. If the obtained swellable resin is heated longer or heated at a higher temperature, the resin is converted into a more crosslinked and less swelling polymer.

Namely, the polymer of the invention, soluble in water as described above, is cross-linked into a water insoluble and swellable polymer by heat-treatment. The obtained somewhat crosslinked resin has the structure (II) shown below which is provided only for explanation and without any intention to be bound to the illustration.

wherein, a,b,c, and d denote integers included in m shown in the formula (I).

The degree of the cross-linking is optionally changed by controlling the treating temperature and/or treating time.

The water insoluble and finitely swellable resin of the structure (II) has a decreased functionality composed to the original resin, since the condensation reaction occurs between a free carboxylic group and an imino group to give rise to cross-linking between molecules of the resin. However, because the water insoluble and finitely swellable resin has basically the same structure as that of the water soluble original resin, the said resin is also useful as a heavy metal capturing agent.

That is to say, the resin of formula (I) of the present invention shows a high solubility in water because of its low degree of condensation of about several molecules to over 10 molecules as mentioned hereinafter and the water insoluble and swellable resins of the structure (II) obtained from the above resin are also useful as a precipitating agent.

The present resin of formula (I) shows a moisture regain of 100 to 140% under saturated water vapour at 18°–20° C. and is dissolved into a small amount of water. The water insoluble and finitely swellable resin of the formula (II) obtained by heating the resin having formula (I) shows a swelling ratio of 200 to 1000%.

As mentioned above, a resin having specific chelating properties can be obtained by introducing several functional radicals into the resin of formula (I).

Namely, the present invention provides a polymer having formula (III)

wherein, m signifies an integer of 2 to 6 or a mixture having an average value m of 4 to 5, n signifies a mixture having an average value n of 4 to 10, X' signifies Y has the same meaning as in the above, and Z signifies H atom, carboxy lower alkyl group, dithiocarbamate radical or lower alkyl group, provided that Z is not hydrogen atom in all of its occurrences, by introducing chelate groups such as carboxy alkyl, dithiocarbamate or lower alkyl group into the imino group in the repeating ethyleneimine group in the compound having formula (I).

The chelating polymer shown by formula (III) provides resins having several characteristic features by controlling the amounts of groups introduced into the resin of formula (I).

The resin of the invention having the formula (I) can be easily obtained by condensation of butane-1,2,3,4-tetra-carboxylic acid or an anhydride thereof with a suitable number of mols of polyethylenepolyamine. The condensation is easily carried out by mixing the raw materials in the presence of a small amount of water or organic polar solvent or in the absence of any solvent at a temperature higher than 100° C. and lower than 140° C. to obtain the resin having formula (I). As the polar solvent usable as a solvent in the invention there are illustrated, for example, dimethylformamide, dimethylsulfoxide, cresol, etc., the solvents preferably having a boiling point of higher than 100° C.

The presence of water in the reaction mixture is not necessarily required in the reaction, but the presence of a small amount of water makes it easy to mix together the starting materials thoroughly.

The polymer having formula (I) can be obtained by reacting both starting materials at a temperature of 100° to 140° C.

The polycondensation reaction under such a low temperature does not cause the cross-linking reaction between molecules, but there takes place only polycondensation between the molecules to make up a chain polymer showing a high solubility in water.

Butane-1,2,3,4-tetra-carboxylic acid used in the invention is a known compound easily prepared by oxidizing cyclohexene-4,5-dicarboxylic acid, which can be easily obtained by Diels-Alder reaction of butadiene and maleic acid anhydride.

Polyethylenepolyamines used in the invention are illustrated as follows:
diethylenetriamine, triethylene-tetramine and tetraethylenepentamine and the like.

In the case of using an organic solvent in the polycondensation, the reaction is carried out in such a manner that polyethylenepolyamine is added dropwise to the solution of butane-1,2,3,4-tetra-carboxylic acid in the organic solvent.

When using dimethylformamide as solvent, precipitation occurs at once, but the reaction is continued for a predetermined period at a predetermined temperature to complete the reaction. In the case of using dimethylsulfoxide or cresol as solvent, the reaction products are formed as a solution in the reaction solvents. Therefore, the product is precipitated by adding alcohol to the reaction mixture after cooling. The yield of the product is said to be approximately theoretical.

In the case of the reaction using no solvent, the polymer is easily obtained by mixing butane-1,2,3,4-tetra-carboxylic acid with polyethylenepolyamine at a temperature of 100° to about 140° C.

In the case of the reaction using a small amount of water as mixing agent, butane-1,2,3,4-tetra-carboxylic acid and polyethylenepolyamine are mixed together in the presence of a small amount of water and heated at a temperature of about 130° to about 140° C. The product is obtained in the form of caramel by a dehydration reaction. Then the caramel-like product is cooled. The product is obtained as a rosin-like product.

The polymer having formula (I) can be obtained as a linear polymer manner mentioned in the above and shows a high solubility in water, but the existence of a small amount of cross-linking product in the polymer is harmless to the invention.

Moreover, when the linear polymer of formula (I) is heated to a temperature of about 130° to 160° C. for 0.5 to 3 hours, water insoluble and finitely swellable polymer having cross-linking bonds therein illustrated above as structure (II) is obtained. The obtained product can be used for the same object as that of the linear polymer.

By continuing the heating of the resin of formula (I) for a longer time or heating it at a higher temperature, a water insoluble high molecular weight polymer can be obtained by increasing the cross-linking between molecules. The obtained resin can be expected to be used for, the same purpose as the polymer of formula (I) as a heavy metal capturing resin.

The determination of the molecular weight of the linear polymer of the invention is difficult. However, when measuring the intrinsic viscosity $[\eta]$ of the resin in water, a value of 0.05 to 0.10 dl/g is obtained. From the value of the intrinsic viscosity, it is inferred that the linear polymer may be a polymer having a low degre of condensation. On the other hand the number average molecular weight (hereinafter referred to as $MW_n$) was determined by GPC method to be 2000 to 2500.

In order to obtain the polymer having formula (III), several kinds of chelating functional groups may be introduced into the imino group in the main chain of the linear polymer. For example, a methyl group can be introduced to the said amino radical with dimethylsulfuric acid, or a carboxy methyl group radical may be introduced into the said imino radical with chloroacetic acid. Furthermore, a dithiocarbamate group can be introduced to the said imino group by the use of carbon-disulfide in an alkaline medium. The introduction of various kinds of chelating functional groups to the linear polymer of formula (I) can improve the chelating property thereof.

In such cases, chelate resins having such a chelating functionality in the molecule reveal respectively particular chelating abilities by changing the ratio of introduction of chelating groups, and those resins are advantageously used as a metal precipitating agent having a particular precipitating property.

Some compounds having a single structure have been illustrated above as the polyethylenepolyamine usable in the invention, but a mixture thereof can also be used. Moreover, a mixture of polyethylenepolyamine containing a small amount of hexaethyleneheptamine and other higher polyethylenepolyamines obtained by simple distilling, not fractional distillation, of the bottoms by-produced in the course of production of ethylenediamine by the reaction of ethylenedichloride with ammonia can be preferably used in the reaction because of their low cost.

The polymer having formula (I) and the derivatives thereof mentioned above (referred to as the polymer of the invention hereinafter) form resin chelates with many kinds of metal ions as shown below.

In the case of a metal ion to form a water soluble chelate compound, Ca chelate compounds of the polymer of the invention are, at first, prepared, and then the Ca chelate compounds are added to an aqueous solution containing the metal ion to be precipitated to form a mixed chelate compound of Ca and the metal ion by partially substituting Ca ion thereof with the said metal ion.

As explained above, the polymer of the invention forms a chelate compound or polymer chelate with several kinds of metal ions, and these polymer chelates are slightly soluble or insoluble in water. Accordingly, the polymer of the invention can be advantageously used for the removal and recovery of the novel or heavy metals. Furthermore, the procedures used in the removal and recovery invention are simple as shown in the below and the efficiency thereof is high as shown in the examples.

Therefore, the polymer of the present invention can be applied to various purposes as a useful chelate polymer.

According to the invention, chelating is easily carried out by adding the polymer of the invention to an aqueous solution of metal ions to be chelated. Explaining in more detail, the polymer of the invention is added in the form of an aqueous solution to an aqueous solution containing the metal ion to be treated in the case of a water soluble chelate resin. In the case of a water insoluble and swellable resin, it is added to an aqueous solution of metal ion in the form of swelled resin with water. Then the solution is agitated at an ordinary temperature for about 0.5 to about 3 hours to obtain a stable resin chelate in a form of precipitation. Then the precipitation is filtered out to remove the metal ions as precipitate.

The resin chelate of the invention is explained in more detail in the following.

The polymer of the invention having linear structure and soluble in water has the repeating unit shown below and forms a complex with various kinds of metal ions, wherein m has the same meaning as mentioned in regard to formula (I).

The polymer of the invention soluble in water is cross-linked into a water insoluble and swellable polymer illustrated as structure (II) by heat-treatment thereof. But the formed somewhat cross-linked resin has basically the same structure as the water soluble resin, because the cross-linking is formed between —COOH of the side chain and —NH— in the main chain.

The degree of cross-linking in the resin of structure (II) can be changed by controlling the treating temperature and/or treating time, and the obtained resins show respectively particular properties according to the degree of cross-linking.

These resins contain therein many radicals necessary to the formation of resin chelate, that is, and —NH— and —COOH which are adjacent to each other.

Furthermore, in the case of even if these ions did not carry out chelation, they are considered to be fixed to the resin as carboxylate.

Ag+, Hg2+ and the like are 2-coordinated and form a linear complex, the structure thereof being:

Cu$^{2+}$ has a 4-coordinated plane structure such as:

In the case of Zn$^{2+}$ which is a tetrahedron type 4-coordination, it has a structure well known in the art. In the case of Co$^{3+}$ having an octahedron type 6-coordination, it has a structure well known in the art.

When methylating the polymer of the invention with dimethylsulfate, electron donability or coordinate forming ability is strengthened and —H— becomes When carboxy-methylating radicals of the polymer of the invention with monochloro lower alkyl carboxylic acid such as monochloroacetic acid, the polymer of the invention is bestowed with the same structure as EDTA and forms strong chelate bonds with various kinds of metals.

Furthermore, when dithiocarbamating the radical of the polymer, a polymer forming a strong chelate bond with $Ag^+$, $Hg^{2+}$, $Ni^{2+}$ and the like is obtained.

As discussed above, not only the polymers of the invention, namely either the linear type water soluble resin or the cross-linked swellable type water insoluble resin, but the modified polymers of the invention obtained by methylating, carboxy-methylating or dithiocarbamating, etc., of the resin of the formula (I) show respectively improved chelate forming abilities. Accordingly, all of the resins of the invention can advantageously be utilized as powerful removers or recovering agents of useful metals.

Metal ions for which the polymer of the invention can advantageously be used are illustrated in the following.

| Coordinating Number | |
|---|---|
| 2 | Cu(I), Ag(I), Hg(I), Hg(II) |
| 4 | Zn(II), Cd(II), Hg(II), Al(III), Co(II), Ni(II), Cu(II), Ag(II), Au(III), Pd(II), Pt(II) |
| 6 | Ti(IV), V(III), V(IV), Cr(III), Fe(II), Fe(III), Co(II), Co(III), Ni(II), Pd(IV), Pt(IV), Cd(II), Al(III), Sn(II), Sn(IV), Pb(II), Pb(IV) |
| 8 | Mo(IV), W(IV), U(IV) |

The present invention will be explained below by way of examples for the purpose of illustration and without any intention to add any limitations to the invention.

EXAMPLE 1

58.5 g (0.25 mol) of butane-1,2,3,4-tetra-carboxylic acid (meso type, m.p. 187°–189° C.) was dissolved to 580 g of dimethyl formamide. The solution was charged to a three necked flask (2 l volume). Then a triethylene- tetramine solution in dimethylformamide (36.6 g in 50 g of solvent) was added dropwise to the flask at 20° C. As soon as the solution was added to the flask, precipitation occurred. The temperature of the contents of the flask was raised to 110° C. during 1 to 2 hours, the precipitate became sticky in a candy state and was separated from the solvent. The temperature was raised to 115° C. and cooled to room temperature, and then left as it stood for one night, then the precipitate was solidified. The precipitate was pulverized, filtered out, washed with dimethylformamide and dried under reduced pressure. The product is obtained as a yellow powder, and has a good water solubility and shows deliquescence. Yield: 99 g. The product was dissolved in water and a large amount of alcohol was added to the solution to precipitate again. The precipitation was repeatedly washed with alcohol, pulverized and dried under reduced pressure to obtain a pale yellow powder. The product has a high level of hygroscopic property and shows a moisture regain of 140% at 18° C. under 100% relative humidity after 24 hours. The product has a wide range softening point of 84° to 110° C. accompanying foaming. The product becomes water insoluble when heated at a temperature of 155° C.

Figure 2:
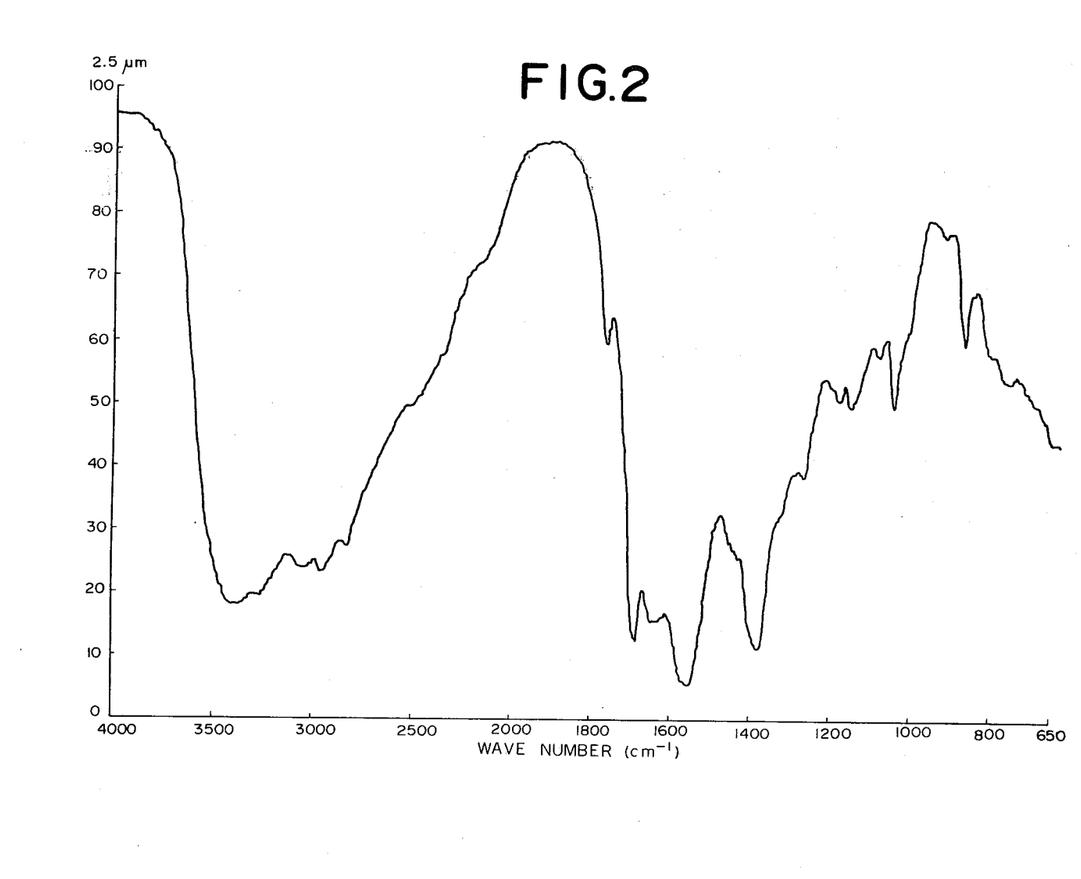

Physical properties thereof are as follows:
  $MW_n$: 2000
  Elementary Analysis: C, 44.0%, H, 7.23%; N, 12.8%
  Infrared Spectrum: Almost the same as that shown in FIG. 2.

EXAMPLE 2

35.1 g (0.15 mol) of butane-1,2,3,4-tetra-carboxylic acid (meso type, m.p. 187°–189° C.) and 200 g of cresol were charged to a three necked flask of 1 l volume and warmed to 80° C. to obtain a solution. A mixture of 21.5 g (0.15 mol) of triethylenetetramine and 40 g of cresol were added dropwise to the flask under agitation. The temperature of the flask was raised to 140° C. during 30 minutes and the reaction continued for 1 hour. The reaction was carried out in a clear solution. Then the reaction mixture was cooled to room temperature under agitation. 1800 ml of ethyl alcohol was added to the flask to sediment precipitates. The precipitates were washed with alcohol and dried under reduced pressure. Yield: 66 g. The thus prepared product was purified by dissolving it in water, precipitating with alcohol, washing with alcohol and drying under reduced pressure. The product was obtained in a brown powder state. Moisture regain of the product was 142% under a condition of 100% relative humidity, at 18° C. and after 24 hours. Softening point was 114° C. (melted with accompanying foams). The product becomes water insoluble at 148° C. The physical properties of the product are as follows.
  molecular weight (MWn): 2040
  elementary analysis: C,50.3%, H,7.4%, N,14.5%
  infrared spectrum: See Fig. 1

EXAMPLE 3

35.1 g (0.15 mol) of butane-1,2,3,4-tetra-carboxylic acid (meso type, m.p. 187°–189° C.) and 200 g of dimethylsulfoxide were charged to a three necked flask of 1 l volume and agitated to obtain a solution. 21.9 g (0.15 mol) of triethylenetetramine solution in 40 g of dimethylsulfoxide was added dropwise to the solution. A mass of precipitate was formed, but became clear by heating to a temperature of 136°–140° C. The reaction was continued for 1 hour at this temperature to form a sticky precipitate. After cooling, the precipitate was removed from the flask and washed with 200 ml of ethyl alcohol, crushed and dried under reduced pressure. Yield: 52 g. One part of the product was purified by dissolving it in water and reprecipitated with alcohol and dried under reduced pressure. Then the purified product was obtained in a yellow powder state. The product showed a good water solubility and 143% of moisture regain after keeping for 24 hours under a condition of 100% relative humidity at 18° C. The product has a softening point of 103° C. When heating the product at 150° C., the product became water insoluble. The physical properties of the product are as follows.
  molecular weight (MWn): 2320
  elementary analysis: C, 49.5% H, 7.7%, N, 14.0%
  infrared spectrum: Almost the same as that of FIG. 1

EXAMPLE 4

70.2 g (0.3 mol) of butane-1,2,3,4-tetra-carboxylic acid (meso type, m.p. 187°–189° C.), 59.4 g (0.3 mol) of tetraethylenepentamine and 40 g of water were charged to an enamel vat in a thickness of about 2 to 3 mm. The vat was put in a hot air furnace and a reaction was conducted for 1 hour at a temperature of 132° to 140° C. Yield: 133 g. The reaction product was obtained in a resin-like copal and was water soluble. The product was dissolved in water and precipitated with alcohol. The precipitate was washed with ethylalcohol, crushed and dried under reduced pressure. The obtained purified product was in a yellow-brown powder state and showed a moisture regain of 160% after keeping it under a condition of 100% relative humidity at 18° C. for 24 hours. Softening point thereof was 78° C. The product was heated at 98° C. Then the product foamed. When heated to a temperature of 145° C., the product was converted into a water insoluble product.
Physical properties of the product are as follows.
  molecular weight (MWn): 2330
  elementary analysis: C, 48.1%, H, 8.6%, N, 15.8%
  infrared spectrum: Shown in FIG. 2

EXAMPLE 5

Figure 1:
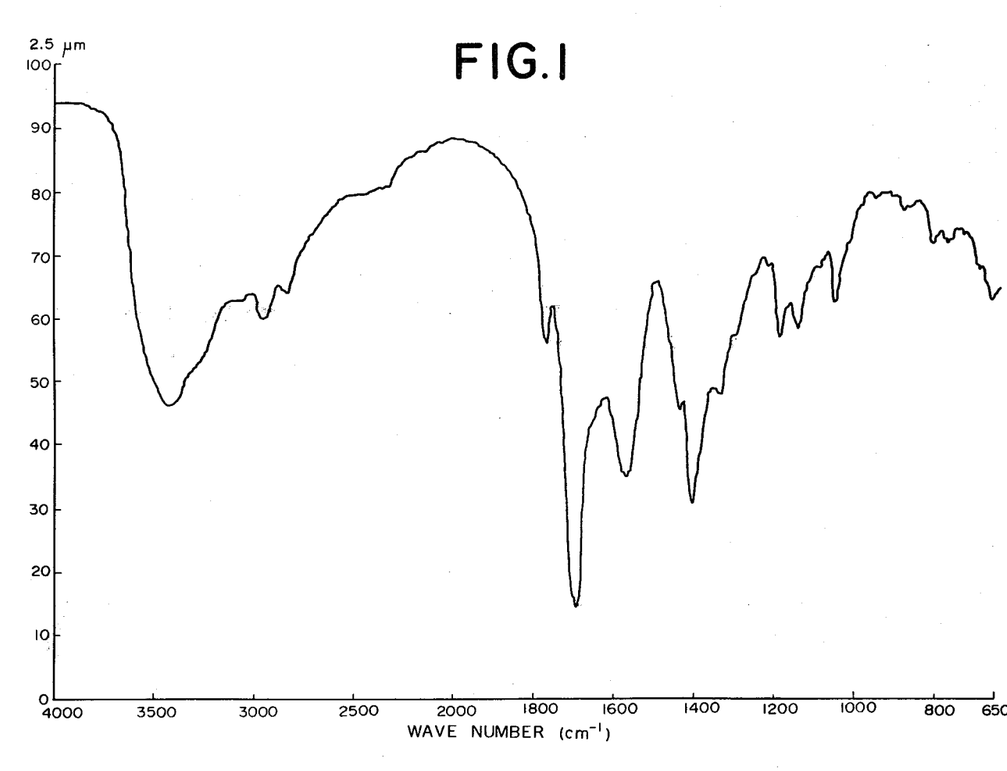
FIG. 1 and FIG. 2 show the infrared spectrums of the polyamide resins of the invention obtained respectively in Examples 2 and 4.

19.8 g (0.1 mol) of butane-1,2,3,4-tetra-carboxylic acid anhydride (m.p. 247°–249° C.) prepared by heating butane-1,2,3,4-tetra-carboxylic acid with acetic acid anhydride was dissolved in 150 ml of dimethylformamide to obtain a solution. The solution was charged to a three-necked flask of 1 l volume. A mixture of 10.3 g (0.1 mol) of diethylenetriamine and 50 ml of dimethylformamide was added dropwise to the solution at 25°–30° C. during 40 minutes from a dropping funnel. Precipitates in a white powder state were formd as soon as adding the mixture to the solution in the flask. The reaction mixture was agitated for 3 hours and then left as it stood for one night. The precipitate formed was filtered and dried. Yield: 26 g. The product was obtained in a white powder state having a softening point of 130° C. and showed good water solubility and hygroscopic property. The hygroscopic property of the resin was 125% (under relative humidity of 100% at 15° C.).
3 g of the resin was dissolved in 100 ml of water to obtain a solution. When an aqueous solution of cupric sulfate was added to the solution, the colour of the solution was changed into deep blue violet. This showed the formation of chelate. When adding an aqueous solution of nickel sulfate to the solution, pale blue precipitates were formed. Ferric sulfate solution formed pale brown precipitates by addition of the same. Both aqueous solutions of lead acetate and cadmium acetate formed white precipitates. The infrared spectrum of the resin is shown in FIG. 1.
Elementary analysis: C, 40.03%, H, 5.74%, N, 12.12%
Furthermore, the resin showed an intrinsic viscosity ($\eta$) of 0.089 dl/g in water at 30° C.

EXAMPLE 6

Figure 3:
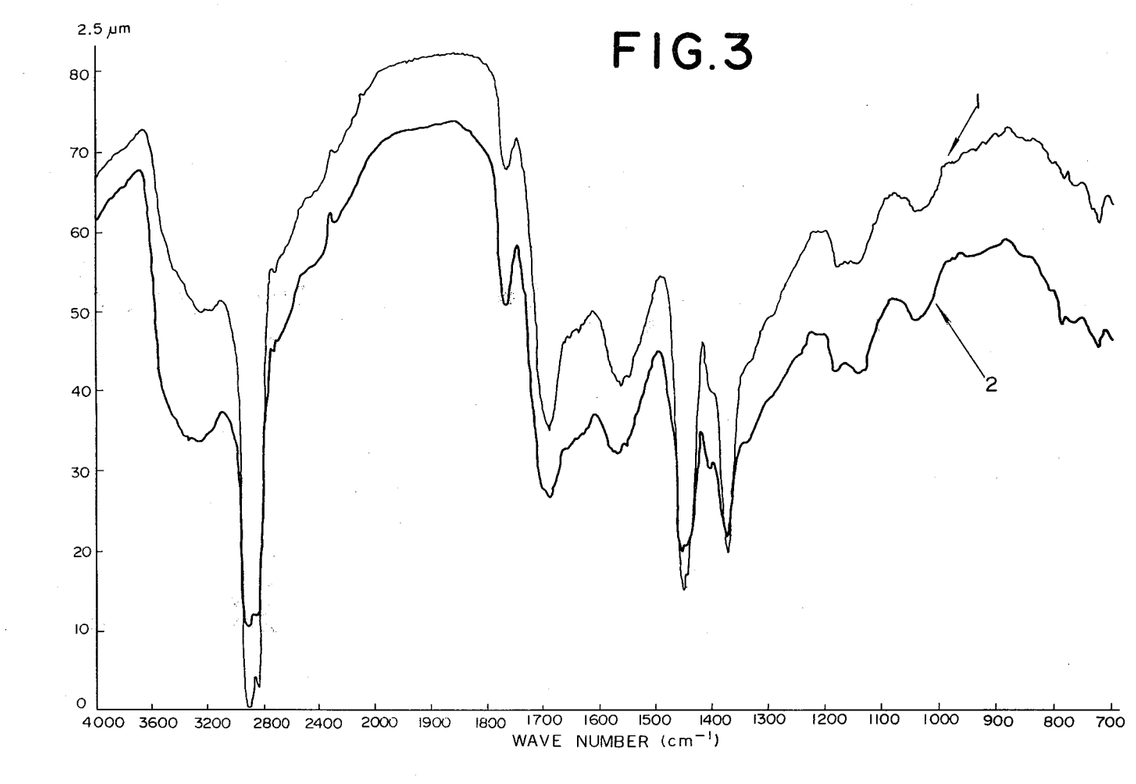
FIG. 3 shows the infrared spectrums of the polyamide resin (1) and (2) obtained in Example 6.

46.8 g (0.2 mol) of butane-1,2,3,4-tetra-carboxylic acid was mixed with 29.2 g (0.2 mol) of triethylenetetramine and agitated at room temperature to obtain a product in a muddy state which gradually solidifies. The reaction mixture was heated and milled at 120° C. to cause reaction gradually at first and then rapidly while evolving steam to carry out a polycondensation reaction. The inner temperature of the reaction mixture reached 130° to 140° C. The obtained reaction product was mixed with 30 ml of water to obtain a homogeneous paste. Then the paste was heated to 150° C. for 1 hour in a hot air furnace to evolve foams and become sticky. The reaction product was cooled to solidify in a pale brown resin state. Yield: 65 g. The thus obtained product was fragile and easily crushable. The infrared spectrum of the product is shown in (1) of FIG. 3. When the obtained resin was dissolved in water, a brown solution was obtained. The product showed an intrinsic viscosity of 0.046 dl/g at 30° C. in water.
If the resinous product was heated to 150° C., a water insoluble resin having brown color was obtained after 2 hours heating. The cross-linked product thus obtained showed a moisture regain of 93% under a relative humidity of 100% at 15° C. The obtained resin swelled well with water. The infrared spectrum of the product is shown in (2) of FIG. 3.

EXAMPLE 7

Figure 4:
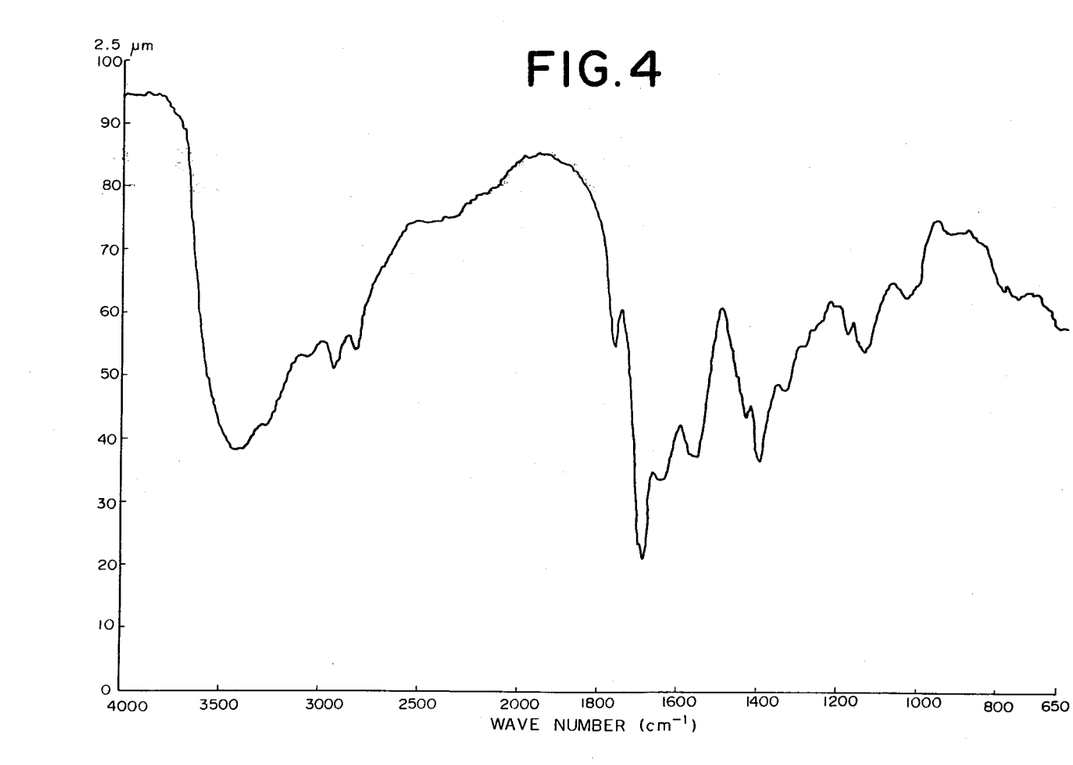
FIG. 4 shows the infrared spectrum of the resin (B) obtained in Example 7.

117 g (0.5 mol) of butane-1,2,3,4-tetra-carboxylic acid (meso type, m.p. 187°–189° C.) and 94.5 g (0.5 mol) of tetraethylenepentamine were milled with 100 ml of water. The mixture evolved spontaneously foams upon milling and the reaction mixture became a yellow-brown sticky liquid containing a small amount of white sticky solid. The obtained sticky mass was spread out in a thickness of 3–4 mm in an enamel vat. Then the vat was put in a hot air furnace kept at a temperature of 145°–155° C. The reaction was continued for 2 hours in the furnace. The dehydrating reaction proceeded in the first 1 hour vigorously while releasing a large amount of tiny foams and then gently while releasing a small amount of big foams and at last a yellow-brown clear resin containing a small amount of bubbles was obtained. The reaction product was cooled to room temperature and 1500 ml of water was added thereto. The reaction product was left as it stood for one night to become a tiny granule mass. The granule mass was filtered and dispersed in 2 l of water to wash. The washing was repeated two more times and the product was filtered out under vacuum. The product was obtained in a form of yellow tiny granular resin (A), the solid content ratio thereof being 41.3%. Yield: 181.7 g as solid.
The resin (A) absorbed 195 mg/g of HCl from an aqueous hydrochloric acid solution (containing 3650 ppm of HCl). By heating the resin (A) in a hot air furnace kept at 140°–145° C. for 90 minutes, a yellow granule like resin (B) was obtained. Infrared spectrum of the resin (B) is shown in FIG. 4. The resin (B) showed a swelling ratio of 227%, absorbed 198 mg of HCl/g of resin from the above mentioned aqueous HCl solution, 200 mg of Ag/g of resin from an aqueous solution of AgNO$_3$ containing 8600 ppm of silver, 500 mg of Hg/g of resin from an aqueous mercuric chloride solution containing 11500 ppm of Hg, 70 mg of Cu/g of resin from an aqueous solution of cupric sulfate containing 5750 ppm of copper, 140 mg of Cd/g of resin from an aqeuous solution of cadmium acetate containing 10600 ppm of cadmium, 40 mg of Zn/g of resin from an aqueous solution of zinc chloride containing 6500 ppm of zinc and 50 mg/g of nickel from an aqueous solution of nickel sulfate containing 4075 ppm of Ni.

The absorbing test used above was carried out as follows.

1 g of dried test resin in a dried state or swelled state was put into 100 ml of the aqueous solution of treated metal ions and agitated and left as it stood. After 16 hours the test resins were filtered out and the remaining amounts of each ion in the filtrate were determined by atomic absorption spectrophotometry. In the case of HCl, the concentration of HCl in the filtrate was measured by titration.

100 g of the resin (B) was dispersed in a flask containing an aqueous solution of 62.4 g of sodium hydroxide in 850 ml of water. A solution of 79 g of carbon disulfide in 60 g of ethyl alcohol was added dropwise to the flask at 20° C. during 15 minutes under agitation. The temperature of the contents of the flask was raised under agitation and maintained at 47° to 49° C. and the reaction continued for 2 hours. Then the temperature of the flask was raised to 60° C. to distill out a fraction having a low boiling point. Then the reaction product was cooled to 20° C. and filtered under reduced pressure.

Figure 5:
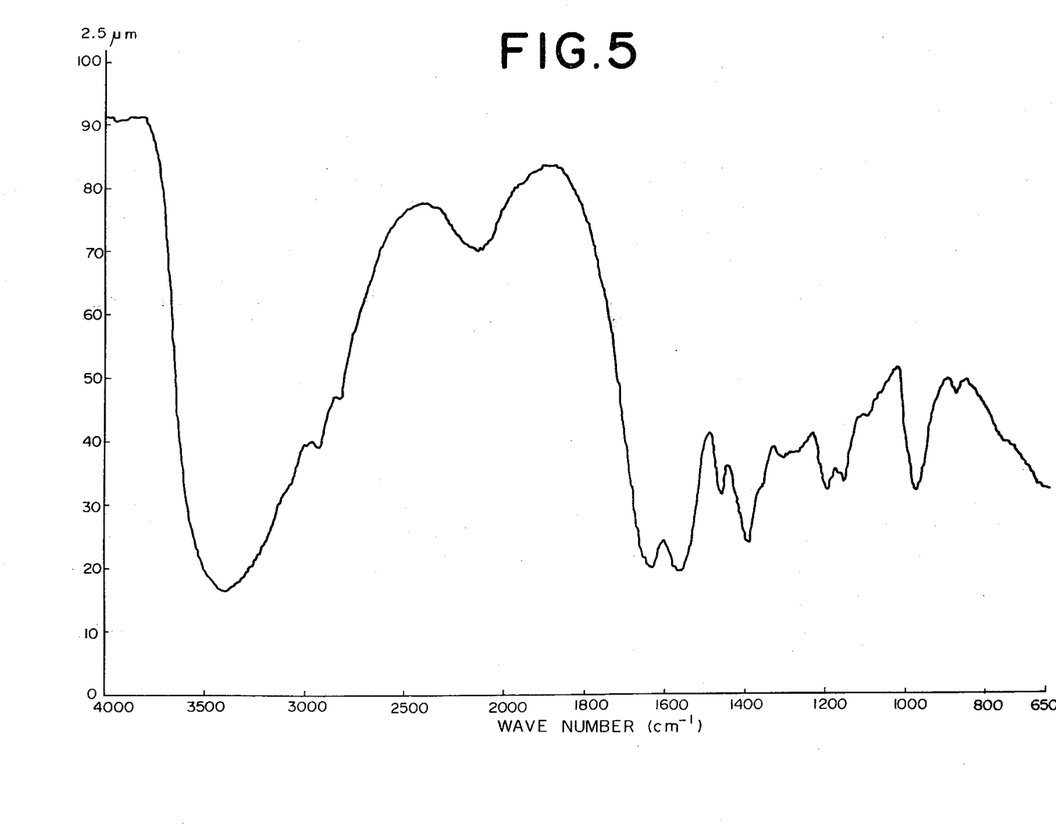
FIG. 5 shows the infrared spectrum of the resin (C) obtained in Example 7.

The reaction product was dispersed in 2 l of water and washed. The washing was repeated two times. The obtained dithiocarbamated resin (C) was obtained in a pale yellow powder state. Infrared spectrum of resin (C) is shown in FIG. 5. The resin (C) has a solid content ratio of 30.8% and the yield thereof was 154 g as solid.

Using the same metal ion solutions as mentioned above, the absorbed amounts of these metals by the resin (C) were examined. The results are as follows:

Ag, 723 mg/g; Hg, 825 mg/g; Cu, 365 mg/g; Cd, 360 mg/g; Zn, 110 mg/g; and Ni, 88 mg/g.

EXAMPLE 8

93.6 g (0.4 mol) of butane-1,2,3,4-tetra-carboxylic acid (meso type, m.p. 187°–189° C.) and 151.4 g (0.8 mol) of tetraethylenepentamine were milled with 100 ml of water. The temperature of the mixture rose spontaneously while generating foams by miling and the reaction mixture became a yellow-brown sticky liquid containing a small amount of white sticky solid. The obtained sticky mass was spread out in a thickness of 3-4 mm in an enamel vat. Then the vat was put in a hot air furnace kept at a temperature of 145°–155° C. The reaction was continued for 2 hours in the furnace. The dehydrating reaction proceeded vigorously in the first 1 hour while releasing large amount of tiny foams and then became a yellow brown clear resin containing a small amount of bubbles. Then the reaction product was cooled to room temperature and 1500 ml of water was added thereto. The reaction product was left as it stood for one night to became a tiny granular mass. The granular mass was filtered and dispersed in 2 l of water to wash. The washing was repeated two more times and the product was filtered under reduced pressure. The product was obtained in the form of yellow tiny granular resin (D), the solid content ratio thereof being 22.8%. Yield: 173.3 g as solid.

The resin (D) absorbed 322 mg/g of HCl from an aqueous hydrochloric acid solution (containing 5475 ppm of HCl). By heating the resin (D) in a hot air furnace kept at 140°–145° C. for 90 minutes, a yellow granule like resin (E) was obtained. The resin (E) showed a swelling ratio of 330%, absorbed 198 mg of HCl/g of resin from the above mentioned aqueous HCl solution, 370 mg of Ag/g of resin from an aqueous AgNO$_3$ solution containing 8600 ppm of silver, 450 mg of Hg/g of resin from an aqueous mercuric chloride solution containing 11500 ppm of Hg, 210 mg of Cu/g of resin from an aqueous cupric sulfate solution containing 5750 ppm of copper, 250 mg of Cd/g of resin from an aqueous solution of cadmium acetate containing 10600 ppm of cadmium, 80 mg of Zn/g of resin from an aqueous zinc chloride solution containing 6500 ppm of zinc and 93 mg of Ni/g of resin from an aqueous nickel sulfate solution containing 4075 ppm of nickel.

The same absorbing test as mentioned in Example 7 was used.

80 g of the resin (E) was dispersed in a flask containing an aqueous solution of 41.4 g of sodium hydroxide in 850 ml of water. A solution of 78.7 g of carbon disulfide in 50 g of ethyl alcohol was added dropwise to the flask at 20° C. during 15 minutes under agitation. The temperature of the contents of the flask was raised under agitation and maintained at 47° to 49° C. to conduct the reaction for 2 hours. Then the temperature of the flask was raised to 60° C. to distill out a fraction having a low boiling point. Then the reaction product was cooled to 20° C. and filtered under reduced pressure.

The reaction product was dispersed in 2 of water and washed. The washing was repeated two times. The obtained dithiocarbamated resin (F) was in a pale yellow powder state. The resin (F) has a solid content ratio of 24.2% and the yield thereof was 121 g as solid.

Using the same metal ion solutions and the same test method as mentioned, the absorbed amounts of these metals by the resin (F) were examined. The results are as follows:

Ag, 819 mg/g; Hg, 1030 mg/g; Cu, 361 mg/g; Cd, 370 mg/g; An, 100 mg/g; and Ni, 165 mg/g.

The measurement methods of HCl and other metals used above are the same as used in Example 7.

EXAMPLE 9

117 g (0.5 mol) of butane-1,2,3,4-tetracarboxylic acid (meso type, m.p. 187°–189° C.) and 187 g (1 mol equivalent) of residual polyethylenepolyamine mixture obtained in the production of ethylenediamine (d$^{20}$:1.042, viscosity: 1275 cps (30° C.), amine value: 1104 mg/KOH), which was obtained as a bottom of distillation in the course of the production of ethylenediamine by reacting ethylenedichloride and ammonia, were milled with 100 ml of water. Then a vigorous reaction occured and the temperature of the reacting mass rose spontaneously to obtain a uniformly sticky condensation product. The condensation product was spread in an enamel vat in a thickness of about 10 mm. The vat was placed in a hot air circulating oven controlled to a temperature of 145°–155° C. and the reaction was continued for 2 hours and a porous resin having a deep brown color was obtained in granule state. The obtained resin was washed with water. The obtained amphoteric polyamide resin showed a solid content ratio of 33.5% and the yield of the resin was 260 g in dry state.

3 g of the obtained resin (containing 1 g of solid) was added to 100 g of an aqueous silver nitrate solution containing 3900 ppm of Ag. The solution was agitated for 2 hours and then the resin was filtered out. The filtrate was titrated with $K_2Ni(CN)_4$ solution. As the result, the absorbed amount of Ag to the resin was determined to be 267 mg per g of resin. By the same method, silver ions was absorbed to the resin using a waste liquor of black and white photograph fixation containing Ag in a concentration of 3000 ppm. As the result, the resin absorbed 88 mg of silver per one gram of resin.

100 g of the resin (solid content 100 g) was dispersed in an aqueous solution of 64 g of sodium hydroxide in 1600 ml of water. Thereto was added an alcoholic solution of 106 g of carbon disulfide in 100 ml of ethyl alcohol. The dispersion was heated at 46–52° C. for 2 hours to carry out the reaction. Then the reaction product was filtered after cooling and washed thoroughly. The dithiocarbamated resin (G) was obtained in yellow granular state. The resin (G) showed water swellability and solid content of 27%. The yield was 160 g calculated as solid.

Elementary Analysis: C 28.4%; H 5.5%; N 9.6%; S 18.8%; Na 8.9%.

The resin (G) absorbed 723 mg of silver/g of resin from the aqueous silver nitrate solution mentioned above, and 360 mg of silver/g of resin from the waste fixing bath liquor mentioned above.

300 mg of the resin was dipped in 5 l of sea water for 10 days and it was found that the resin absorbed 8.7 μg of $UO_2{}^{2+}$ per day. This means that the resin absorbs 32 μg of $UO_2{}^{2+}$/g of resin/day.

EXAMPLE 10

117 g (0.5 mol) of butane-1,2,3,4-tetracarboxylic acid (meso type, m.p. 187°–189° C.) and 113 g (0.6 mol) of tetraethylenepentamine were milled with 100 ml of water. The mixture underwent spontaneous exothermic reaction while releasing foams by milling and the reaction mixture became a yellow-brown sticky liquid. The obtained sticky mass was spread out in a thickness of 3–4 mm in an enamel vat. Then the vat was put in a hot air furnace kept at a temperature of 145°–155° C. The reaction was continued for 2 hours in the furnace. The dehydrating reaction proceeded in the first 1 hour vigorously while releasing a large amount of tiny foams and then gently while releasing a small amount of big foams. Then the foams become large and the viscosity of the reaction mixture increased and at last after 100 hours a yellow-brown clear resin containing a small amount of bubbles was obtained.

Then the reaction product was cooled to room temperature and 1500 ml of water was added thereto. The reaction product was left as it stood for one night to become a tiny granule mass. The granule mass was filtered and dispersed in 2 l of water to wash. The washing was repeated two more times to remove the water soluble impurities. The product was obtained in the form of yellow tiny granular resin (H), the solid content ratio thereof being 39.3%. Yields: 196.5 g as solid The resin absorbed 225 mg/g of HCl from an aqueous hydraulic acid solution (containing 3630 ppm of HCl).

By heating the resin (H) in a hot air furnace kept at 140°–145° C. for 90 minutes, a yellow granule like resin (J) was obtained. The resin (J) showed a swelling ratio of 240%, absorbed 239 mg of HCl/g of resin from the above mentioned aqueous HCl solution, 218 mg of Ag/g of resin from an aqueous solution of $AgNO_3$ containing 4300 ppm of silver, 529 mg/g of Hg from an aqueous mercuric chloride solution containing 5750 ppm of Hg, 122 mg of Cu/g of resin from an aqueous cupric sulfate solution containing 2875 ppm of copper, 208 mg of Cd/g of resin from an aqueous cadmium acetate solution containing 5300 ppm of cadmium, 75 mg of Zn/g of resin from an aqueous zinc chloride solution containing 3250 ppm of zinc and 116 mg of nickel /g of resin from an aqueous nickel sulfate solution containing 2038 ppm of Ni.

The absorbing test mentioned above was carried out in the same way as mentioned in Example 7.

40 g of the resin (J) was dispersed in a flask containing an aqueous solution of 29.6 g of sodium hydroxide in 400 ml of water to have the resin swelled for 30 minutes.

Then the dispersion was taken up in a three-necked flask and a solution of 24.8 g of monochloroacetic acid in 50 ml of water was added dropwise during 25 minutes at a temperature of lower than 15° C. while cooling the flask with water.

Then the temperature of the flask was gradually raised and the temperature reached to 70° C. after 60 minutes. The reaction was continued for 120 minutes at this temperature. The pH of the dispersion was higher than 13.5 just after completing the dropwise addition of monochloroacetic acid, but became 11.4 after 80 minutes and reached to 10 after 100 minutes. The resin swelled well as decreasing the pH of the swelling solution and increased the clearity thereof.

The content of the flask was cooled to an ordinary temperature under agitation and then the agitation was stopped and left as it stood. The supernatant thereof was removed. 1500 ml of water was added to the flask to wash and left as it stood again. The supernatant was removed. Then water was added until the content of the flask reached 1000 ml. HCl aqueous solution was added to the flask and the pH of the liquor in the flask was controlled to 5.

After agitating for 60 minutes, the liquor was filtered. The filtered resin was dispersed in 1000 m of water to wash and filtered. This treatment was repeated two times. Yield: 330 g. Pale yellow fine granular resin showing solid content of 6.7% was obtained.

Elementary analysis: C, 43.6%, H, 6.50%, and N, 13.3%

The obtained resin (K) absorbed several kinds of metal ions from the above mentioned metal ion solution: Ag 119 g/g, Hg 391 mg/g, Cu 94 mg/g, Cd 324 mg/g, Zn 28 mg/g and Ni 194 mg/g. The test method used in the above test is the same one as mentioned in Example 7.

On the other hand, 38.7 g of the resin (J) was dispersed in an aqueous solution of 20 g of sodium hydroxide in 20 g of water to form a dispersion. The dispersion was taken up in a three-necked flask. The resin was swelled under agitation. Then 37.9 g of dimethylsulfide was added dropwise to the flask under cooling with water.

The agitation was continued for 30 minutes. Then the temperature was raised to 52° C.–53° C. and the reaction was continued for 120 minutes at this temperature. The flask was cooled and left as it stood for one night and filtered. The obtained resin was dispersed in 1000 ml of water to wash and filtered. This procedure was repeated two times. Yield: 310 g. A methylated pale yellow fine granule resin having a solid content of 10% was obtained.

Elementary analysis: C, 41.5%, H, 7.76%, N, 12.5%

The obtained resin (L) absorbed several kinds of metal ions from the above mentioned metal ion solutions: Ag 285 mg/g, Hg 410 mg/g, Cu 150 mg/g, Cd 262 mg/g, Zn 77 mg/g and Ca 46 mg/g.

The test method used in the above test was the same one mentioned in Example 7.

What is claimed is:

1. A resin having the formula (I):

wherein,
  m stands for an integer of 2 to 6 or for a mixture having an average value of 4 to 5,
  n stands for a mixture having an average value of 4 to 10,
  X stands for —OH or $+NH-CH_2CH_2)_{\overline{m}}NH_2$, and
  Y signifies H or 2. A resin obtained by heat-treating the resin having the formula (I) according to claim (1) at a temperature of 130° C. to 160° C. for 0.5 to 3 hours.

3. A process for preparing a resin having the formula (I):

wherein,
  m stands for an integer of 2 to 6 or for a mixture having an average value of 4 to 5,
  n stands for a mixture having an average value of 4 to 10,
  X stands for —OH or $+NH-CH_2CH_2)_{\overline{m}}NH_2$, and
  Y signifies H or which comprises reacting butane-1,2,3,4-tetra-carboxylic acid or anhydride thereof with polyethylenepolyamine in the absence of presence of solvent.

4. A process according to claim 3, wherein the reaction is carried out at a temperature of 100° to 140° C.

5. A process according to claim 3, wherein substantially equi-molar amounts of butane-1,2,3,4-tetra-carboxylic acid and polyethylenepolyamine are reacted.

6. A process according to claim 5, wherein the mol ratio of butane-1,2,3,4-tetra-carboxylic acid to polyethylenepolyamine is about 0.9 to about 1.1.

7. A process according to claim 3, wherein the reaction is carried out for about 0.5 to about 8 hours.

8. A process according to claim 3, wherein the polyethylenepolyamine is an amine selected from the group consisting of ethylenediamine, diethylenetriamine, triethylenetetraamine, tetraethylenepentamine, pentaethylenehexamine and hexaethyleneoctamine and a mixture thereof.

9. A process according to claim 3, wherein the polyethylenepolyamine is a distillation product of the bottom obtained in the course of the production of ethylenediamine.

10. A process according to claim 3, wherein the reaction is carried out in anhydrous state.

11. A process according to claim 3, wherein the reaction is carried out in the presence of a small amount of water in a paste state.

12. A process according to claim 3, wherein the reaction is carried out in an organic solvent.

13. A process according to claim 12, wherein the solvent is selected from the group consisting of dimethylformamide, cresol and dimethylsulfoxide.

14. A process according to claim 3, wherein butane-1,2,3,4-tetra-carboxylic acid anhydride is mono-anhydride.

15. A process according to claim 3, wherein butane-1,2,3,4-carboxylic acid anhydride is dianhydride.

16. A process for preparing a resin which comprises heat-treating the resin prepared according to claim 3 at a temperature of about 130° to 160° C. for about 0.5 to 3 hours.

17. A process according to claim 16, wherein the heat-treatment is carried out succeeding to the process according to claim 4 without isolating the resin prepared according to claim 4.

18. A process according to claim 16, wherein the reaction is carried out in anhydrous state.

19. A process according to claim 16, wherein the reaction is carried out in the presence of a small amount of water in a paste state.

20. A process according to claim 16, wherein the reaction is carried out in the presence of solvent.

21. A process according to claim 12, wherein the solvent is selected from the group consisting of dimethylformamide, cresol and dimethylsulfoxide.

22. A heavy metal capturing and noble metal recovering agent which comprises the resin according to claim 1 or 2 as a main component.

23. A heavy metal capturing and noble metal recovering agent according to claim 22, wherein the agent is in the form of an aqueous solution.

24. A heavy metal capturing and noble metal recovering agent according to claim 22, wherein the agent is in the form of a powder.

25. A heavy metal removing and noble metal recovering agent according to claim 22, wherein the recovered and removed ion is selected from the group consisting of $Ag^+$, $Hg^+$, $Hg^{2+}$, $Zn^{2+}$, $Cd^{2+}$, $Al^{3+}$, $Co^{2+}$, $Ni^{2+}$, $Cu^{2+}$, $Ag^{2+}$, $Au^{3+}$, $Pd^{2+}$, $Pt^{2+}$, $Ti^{4+}$, $V^{3+}$, $V^{4+}$, $Cr^{3+}$, $Fe^{2+}$, $Fe^{3+}$, $Co^{3+}$, $Pd^{4+}$, $Pt^{4+}$, $Sn^{2+}$, $SN^{4+}$, $Pb^{2+}$, $Pb^{4+}$, $Mo^{4+}$, $W^{4+}$ and $U^{4+}$.

26. A resin having the formula (III):

wherein,
  m signifies an integer of 2 to 6 or a mixture having an average value of 4 to 5,
  n signifies a mixture having an average value of 4 to 10, X' signifies Y signifies H or

Z signifies H atom, carboxy lower alkyl group, dithiocarbamate radical or lower alkyl group, provided that Z is not hydrogen atom in all of its occurrences.

27. A process for preparing a resin having the formula (III):

(III)

wherein,
m signifies an integer of 2 to 6 or a mixture having an average value of 4 to 5,
n signifies a mixture having an average value of 4 to 10,
X' signifies

Y signifies H or

Z signifies H atom, carboxy lower alkyl group, provided that Z is not hydrogen atom in all of its occurrences, which comprises reacting a resin having the formula (I):

wherein,
m stands for an integer of 2 to 6 or for a mixture having an average value of 4 to 5,
n stands for a mixture having an average value of 4 to 10,
X stands for —OH or —NH—CH$_2$CH$_2$)$_m$NH$_2$, and
Y signifies H or with monochloro-lower alkyl-carboxylic acid in water or organic solvent in the presence of hydrogen chloride removing agent.

28. A process according to claim 27, wherein the monochloro-lower alkyl-carboxylic acid is monochloroacetic acid.

29. A process for preparing the resin having the formula (III):

(III)

wherein,
m signifies an integer of 2 to 6 or a mixture having an average value of 4 to 5,
n signifies a mixture having an average value of 4 to 10,
X' signifies Y signifies H or

Z signifies H atom or dithiocarbamate group, provided that Z is not hydrogen atom in all of its occurrences, which comprises reacting a resin having the formula (I):

(I)

wherein,
m stands for an integer of 2 to 6 or for a mixture having an average value of 4 to 5,
n stands for a mixture having an average value of 4 to 10,
with carbondisulfide in an aqueous solution of sodium hydroxide.

30. A process for preparing a resin having the formula (III):

(III)

wherein,
m signifies an integer of 2 to 6 or a mixture having an average value of 4 to 5,
n signifies a mixture having an average value of 4 to 10,
X' signifies Y signifies H or Z signifies H atom, lower alkyl group, provided that Z is not hydrogen atom in all of its occurrences, which comprises reacting a resin having the formula (I):

wherein, m stands for an integer of 2 to 6 or for a mixture having an average value of 4 to 5, n stands for a mixture having an average value of 4 to 10, X stands for —OH or —NH—$CH_2CH_2)_m$NH$_2$, and Y signifies H or with di-lower alkyl-sulfate in water in the presence of acid-removing agent.

31. A process according to claim 30, wherein the acid-removing agent is sodium hydroxide.

* * * * *